United States Patent [19]

Kayanuma

[11] Patent Number: 5,245,865
[45] Date of Patent: Sep. 21, 1993

[54] DEVICE FOR DETERMINING MISFIRING CYLINDER OF MULTICYLINDER ENGINE

[75] Inventor: Nobuaki Kayanuma, Gotenba, Japan

[73] Assignee: Toyota Jidosha Kabushiki Kaisha, Toyota, Japan

[21] Appl. No.: 837,237

[22] Filed: Feb. 14, 1992

[30] Foreign Application Priority Data

Feb. 19, 1991 [JP] Japan .................................. 3-24497

[51] Int. Cl.⁵ ......................................... G01M 15/00
[52] U.S. Cl. ................................................. 73/117.3
[58] Field of Search ............... 73/116, 117.3; 123/419; 364/431.07

[56] References Cited

U.S. PATENT DOCUMENTS 4,586,369 5/1986 Vogler .............................. 73/117.3
5,197,325 3/1993 Tamura et al. .................... 73/117.3

FOREIGN PATENT DOCUMENTS 61-81532 4/1986 Japan .
61-258955 11/1986 Japan .
62-228929 10/1987 Japan .

Primary Examiner—Jerry W. Myracle
Attorney, Agent, or Firm—Kenyon & Kenyon

[57] ABSTRACT

A rotor with outer teeth is fixed to a crankshaft, a crank angle sensor is disposed facing the outer teeth of the rotor, and the angular velocity of the crankshaft in the power stroke of the cylinders is found from the output pulses of the crank angle sensor. In this case, if the ignition sequence is 1-3-4-2, the angular velocities of the crankshaft for the no. 1 cylinder #1 and the no. 4 cylinder #4 are calculated from the output pulses generated based on the outer teeth of the same region I, while the angular velocities of the crankshaft for the no. 3 cylinder #3 and the no. 2 cylinder #2 are calculated from the output pulses generated based on the outer teeth of the same region II. Therefore, even if there is a manufacturing error in the outer teeth of the region I, so long as no misfire occurs, the angular velocities of the crankshaft will be the same for the no. 1 cylinder #1 and the no. 4 cylinder #4. As opposed to this, if a misfire occurs at the no. 1 cylinder #1, the angular velocity of the crankshaft at the power stroke of the no. 1 cylinder #1 will become slower than the angular velocity of the crankshaft at the power stroke of the no. 4 cylinder #4 and therefore it can be detected that the no. 1 cylinder #1 has misfired.

21 Claims, 13 Drawing Sheets

DEVICE FOR DETERMINING MISFIRING CYLINDER OF MULTICYLINDER ENGINE

BACKGROUND OF THE INVENTION

1. Field of the Invention

The present invention relates to a device for determining a misfiring cylinder of a multicylinder engine.

2. Description of the Related Art

When one of the cylinders in a multicylinder engine misfires, the engine rotational speed drops at the power stroke of the misfiring period and therefore the time required for the crankshaft to turn by a certain crank angle during the power stroke of the misfiring cylinder becomes longer than that of other cylinders.

Therefore, for example, there is known a multicylinder engine where it is judged, for example, that the no. 1 cylinder has misfired when the period required for the crankshaft to turn by a certain crank angle in the power stroke of the no. 1 cylinder becomes longer than that of other cylinders (see Japanese Unexamined Patent Publication (Kokai) No. 62-228929).

In such a multicylinder engine, however, there are provided a rotor which is made to rotate synchronously with the crankshaft and which is formed with outer teeth and an electromagnetic pickup which is arranged in proximity to the outer teeth of the rotor and which produces an output pulse when facing an outer tooth. The time required for the crankshaft to turn by a certain crank angle is found from the time interval of generation of these output pulses. The outer teeth of the rotor, however, suffer from large manufacturing error and therefore when trying to find the time required for the crankshaft to turn by a certain crank angle from the time interval of generation of the output pulses in the above way, there will be a difference in the time required for the crankshaft to turn by a certain crank angle in the power stroke of the no. 1 cylinder, for example, and the time required for the crankshaft to turn by a certain crank angle in the power stroke of the other cylinders even when no misfire occurs.

Even if such a difference occurs, a misfiring cylinder usually causes the rotational speed to fall considerably, so there would be no mistaken judgement if judging that a misfire has occurred when the difference is more than a relatively large set value. During high speed engine operation, however, the power stroke becomes shorter in duration, so even if a misfire occurs, the rotational speed does not drop that much. Also, during low load engine operation, the output torque is inherently low, so the rotational speed will not drop that much even if a misfire occurs. Therefore, when judging that a misfire has occurred when the difference is greater than a relatively large set value as mentioned above, it is not possible to detect the occurrence of a misfire during high speed engine operation and low load engine operation. On the other hand, if the setting is made lower so as to enable detection of a misfire during high speed engine operation and low load engine operation, the result will be a mistaken judgement of a misfire occurring even when it has not and therefore the setting has to be made a relatively large value. In the final analysis, there has been the problem that it was not possible to detect a misfire at operating regions such as during high speed engine operation and low load engine operation where the engine rotational speed does not fall that much even when a misfire occurs.

SUMMARY OF THE INVENTION

The object of the present invention is to provide a device for detecting a misfiring cylinder of a multicylinder engine which can accurately discriminate a misfiring cylinder.

According to the present invention, there is provided a device for determining a misfiring cylinder of a multicylinder engine having a crankshaft, comprising a rotor rotating in synchronization with the crankshaft and having a plurality of detectable elements which are equiangularly arranged on the rotor; detecting means arranged to successively face the detectable elements and produce an output signal every time the detecting means faces each detectable element; angular velocity calculating means for calculating angular velocities of the crankshaft in at least a part of the power stroke period of two different cylinders on the basis of the output signals of the detecting means, which signals are produced by using a part of said detectable elements arranged in the same region of the rotor; difference calculating means for calculating a difference between the angular velocities in the part of the power stroke period of two different cylinders; and determining means for determining that a misfire occurs in one of two cylinders in which the angular velocity is lower when the difference exceeds a predetermined value.

The present invention may be more fully understood from the description of preferred embodiments of the invention set forth below, together with the accompanying drawings.

DESCRIPTION OF THE PREFERRED EMBODIMENTS

Figure 1:
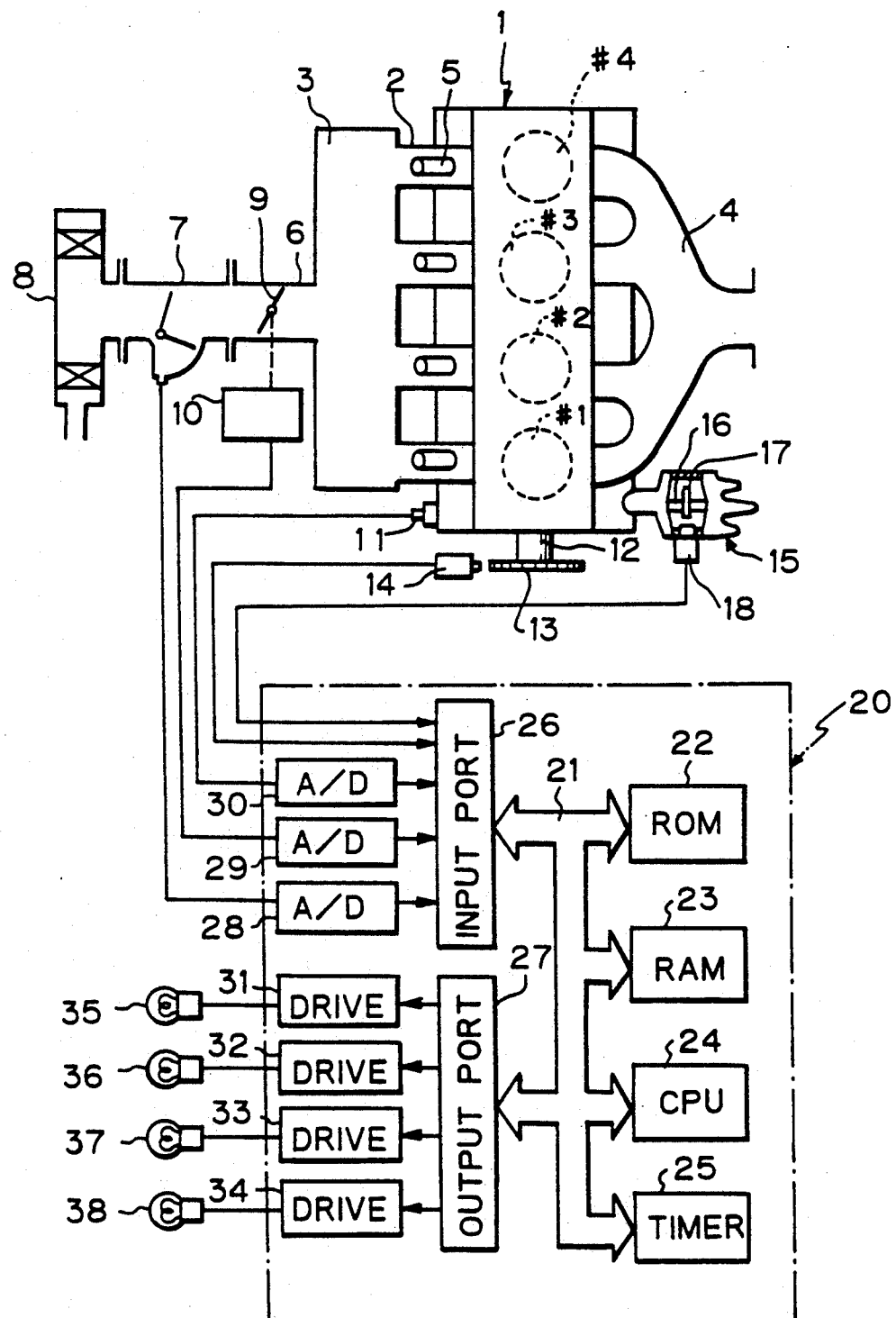
FIG. 1 is an overall view of an internal combustion engine.

Referring to FIG. 1, the internal combustion engine 1 is provided with four cylinders: the no. 1 cylinder #1, no. 2 cylinder #2, no. 3 cylinder #3, and no. 4 cylinder #4. The cylinders are connected to a surge tank 3 through corresponding branching pipes 2 and on the other hand are connected to an exhaust manifold 4. In each of the branching pipes 2 is mounted a fuel injector 5. The surge tank 3 is connected to an air cleaner 8 through a suction duct 6 and an air flow meter 7. In the suction duct 6 is disposed a throttle valve 9. The throttle valve 9 has mounted to it a throttle sensor 10 for detecting the opening of the throttle valve 9, while the body of the internal combustion engine 1 has mounted to it a water temperature sensor 11 for detecting the temperature of the cooling water of the engine. On the other hand, the crankshaft 12 of the internal combustion engine 1 has mounted to it a disc-shaped rotor 13. At the outer circumference of the rotor 13, there is disposed a crank angle sensor 14 in an opposing manner. The internal combustion engine 1 also has mounted to it a distributor 15, which distributor 15 is provided with a shaft 16 which turns at a speed one-half that of the crankshaft 12. The shaft 16 has affixed to it a disc-shaped rotor 17. At the outer circumference of the rotor 17 is disposed a TDC sensor 18 in an opposing manner. The crank angle sensor 14 and the TDC sensor 18 are connected to an electronic control unit.

The electronic control unit 20 is comprised of a digital computer and includes a ROM (read only memory) 22, a RAM (random access memory) 23, a CPU (microprocessor) 24, a timer 25, an input port 26, and an output port 27, all mutually connected through a two-way bus 21. The timer 25 is comprised of a free running counter which performs a count-up function when power is supplied to the electronic control unit 26, therefore the count of the free running counter shows the time. The air flow meter 7 issues an output pulse proportional to the amount of intake air. The output voltage of the same is input to the input port 26 through an AD converter 28. The throttle sensor 10 issues an output voltage proportional to the opening of the throttle valve 9, which output voltage is input through an AD converter 29 to the input port 26. The water temperature sensor 11 issues an output voltage proportional to the temperature of the engine cooling water, which output voltage is input via an AD converter 30 to the input port 26. Further, the output signals of the crank angle sensor 14 and the TDC sensor 18 are input to the input port 26. On the other hand, the output port 27 is connected through corresponding drive circuits 31, 32, 33, and 34 to an alarm lamp 35 showing that the no. 1 cylinder #1 has misfired, an alarm lamp 36 showing that the no. 2 cylinder #2 has misfired, an alarm lamp 37 showing that the no. 3 cylinder #3 has misfired, and an alarm lamp 38 showing that the no. 4 cylinder #4 has misfired.

Figure 2:
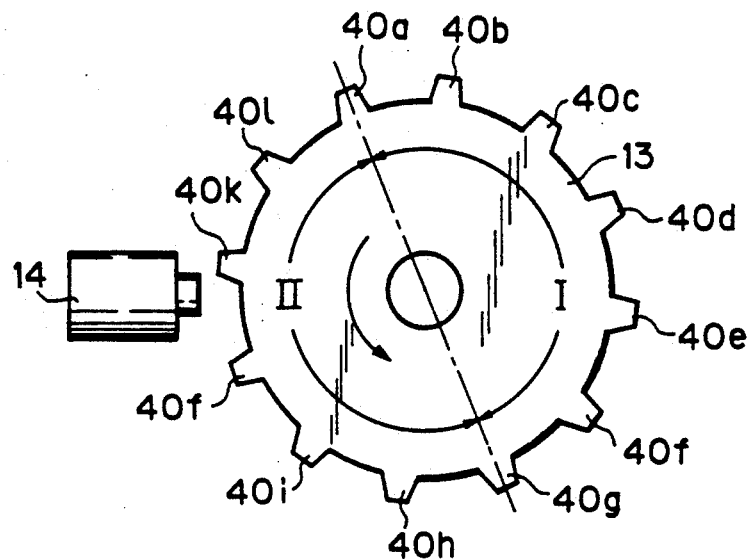
FIG. 2 is a front view of a rotor.

FIG. 2 shows the rotor 13 and the crank angle sensor 14. In the embodiment shown in FIG. 2, the rotor 13 has 12 outer teeth 40a to 40l formed equiangularly every 30 degrees. The crank angle sensor 14 is comprised of an electromagnetic pickup which issues an output pulse when facing the outer teeth 40a to 40l. Therefore, in the embodiment shown in FIG. 2, it will be understood that the outer teeth 40a to 40l constitute detectable elements. When the crankshaft 12 (FIG. 1) turns, that is, when the rotor 13 turns in the arrow direction in FIG. 2, the crank angle sensor 14 issues an output pulse each time the crankshaft 12 turns 30 degrees and the output pulse is input to the input port 26 (FIG. 1).

Figure 3:
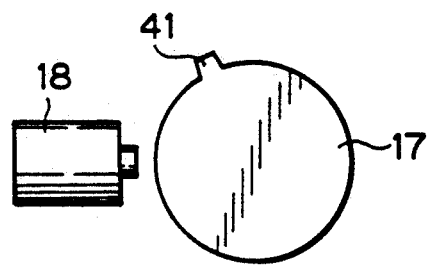
FIG. 3 is a front view of a rotor.

On the other hand, FIG. 3 shows the rotor 17 and the TDC sensor 18. In the embodiment shown in FIG. 3, the rotor 17 has a single projection 41, while the TDC sensor 14 is comprised of an electromagnetic pickup which issues an output pulse when facing the projection 41. As mentioned before, the rotor 17 is turned at a rotational speed one-half that of the crankshaft 12 (FIG. 1). Therefore, when the crankshaft 12 turns, the TDC sensor 18 issues an output pulse every time the crankshaft 12 turns 720 degrees and this output pulse is input to the input port 26 (FIG. 1). The projection 41 is arranged in position so as to face the TDC sensor 18 when, for example, the no. 1 cylinder #1 reaches the TDC of its power stroke. Therefore, the TDC sensor 18 issues the output pulse when the no. 1 cylinder #1 reaches the TDC of the power stroke.

Next, an explanation will be made of the basic ideas for the discrimination of the misfiring cylinder according to the present invention.

When a misfire occurs in any one of the cylinders, the engine rotational speed at the power stroke of the misfiring cylinder falls, that is, the angular velocity of the crankshaft 12 becomes smaller. When the angular velocity of the crankshaft 12 becomes smaller, the time interval of generation of output pulses by the crank angle sensor 14 becomes longer and therefore it is possible to judge if a misfire has occurred from the time interval of generation of the output pulses of the crank angle sensor 14. However, to detect the change in the angular velocity of the crankshaft during a power stroke of a certain cylinder, it is necessary that the power stroke of the next cylinder not have an effect on the angular velocity of the crankshaft. In a four-cylinder engine 1 as shown in FIG. 1, the power stroke is repeated every 180 degrees of crank angle, so if the change of the crankshaft angular velocity in a range of 180 degrees crank angle is detected, then the effect of the power stroke of the next cylinder will not appear in the angular velocity of the crankshaft during detection. The angular velocity of the crankshaft in the range of 180 degrees crank angle may be found from the time interval of generation of output pulses by a pair of outer teeth positioned at opposite sides in FIG. 2, for example, 40a and 40g.

The ignition sequence of the four-cylinder engine shown in FIG. 1 is 1-3-4-2. Therefore, when calculating the angular velocity of the crankshaft in the power stroke of the no. 1 cylinder #1 in FIG. 2 from the time interval from the generation of the output pulse by the outer tooth 4a to the generation of the output pulse by the outer tooth 40g, that is, when calculating the crankshaft angular velocity in the power stroke of the no. 1 cylinder #1 using the outer teeth in the region I in FIG. 2, the angular velocity of the crankshaft in the power stroke of the no. 3 cylinder #3 is calculated based on the time interval from the generation of the output pulse by the outer tooth 40g to the generation of the output pulse by the outer tooth 40a, that is, using the outer teeth of the region II in FIG. 2. Next, the angular velocity of the crankshaft in the power stroke of the no. 4 cylinder #4 is calculated using the outer teeth of the region I of FIG. 2 and the angular velocity of the crankshaft in the power stroke of the no. 2 cylinder #2 is calculated using the outer teeth of the region II of FIG. 2. Therefore, the angular velocities of the crankshaft in the power strokes of the no. 1 cylinder #1 and the no. 4 cylinder #4 are detected using the outer teeth of the same region I in FIG. 2, while the angular velocities of the crankshaft in the power strokes of the no. 2 cylinder #2 and the no. 3 cylinder #3 are detected using the outer teeth of the same region II of FIG. 2.

Therefore, when no misfire occurs in any of the cylinders and the engine operates stably, even if the outer teeth in the region I, that is, the outer teeth 40a and 40g, deviate from their normal shape or position, the angular velocities of the crankshaft detected for the no. 1 cylinder #1 and the no. 4 cylinder #4 will become equal. Similarly, even if the outer teeth in the region II, that is, the outer teeth 40a and 40g, deviate from their normal shape or position, the angular velocities of the crankshaft detected for the no. 2 cylinder #2 and the no. 3 cylinder #3 will become equal. If, however, a misfire occurs in the no. 1 cylinder #1, the angular velocity of the crankshaft detected for the no. 1 cylinder #1 will become slower than the angular velocity of the crankshaft detected for the no. 4 cylinder #4. Further, if a misfire occurs in the no. 2 cylinder #2, the angular velocity of the crankshaft detected for the no. 2 cylinder #2 will become slower than the angular velocity of the crankshaft detected for the no. 3 cylinder #3. That is, if there is a difference in the angular velocities of the crankshaft calculated based on the outer teeth of the same region I or II, even if the outer teeth of the regions I and II deviate from their normal shape or position, it can be accurately detected at which cylinder the misfire has occurred. This is the first idea in the detection of a misfire by the present invention.

The second idea for detection of a misfire by the present invention is that of detecting a misfire by another method and confirming by the first idea if the misfire detected by that other method was truly due to a misfire or was due to the outer teeth deviating from their normal shape or position. That is, the idea is to judge that a misfire has occurred only when confirming by the first idea that a misfire has truly occurred when a misfire is detected by the above-mentioned other method.

Next, an explanation will be made of the above-mentioned first idea with reference to FIG. 4.

Figure 5:
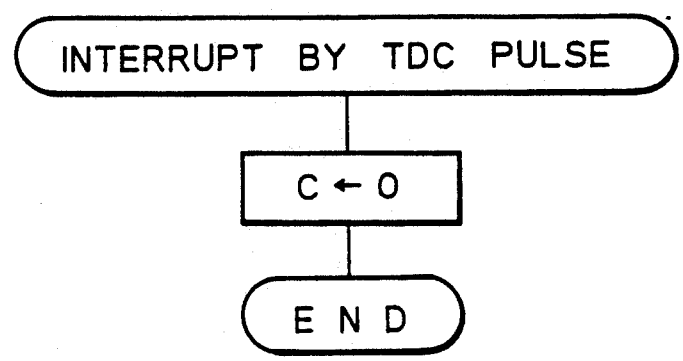
FIG. 5 is a flow chart.
Figure 4:
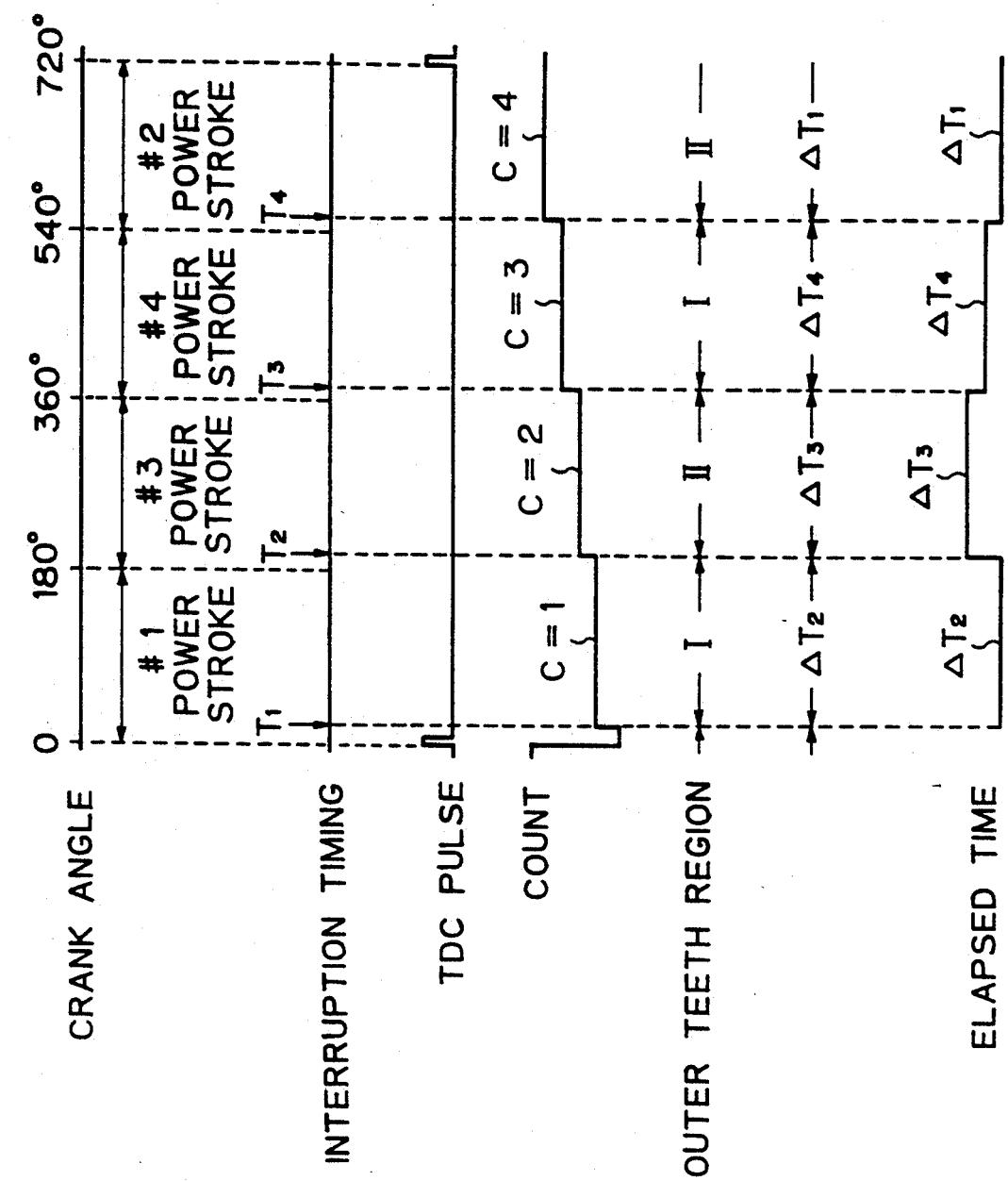
FIG. 4 is a time chart.

In FIG. 4, the crank angle is shown based on the TDC of the power stroke of the no. 1 cylinder #1. As mentioned earlier, when the no. 1 cylinder #1 reaches the TDC of its power stroke, the TDC sensor 18 issues a TDC pulse as shown in FIG. 4. When this TDC pulse is generated, the interruption routine shown in FIG. 5 is executed and the count C of the counter is made zero. On the other hand, when the TDC of the power strokes of the cylinders are slightly exceeded, as shown by $T_1$, $T_2$, $T_3$, and $T_4$ in FIG. 4, the interruption routine is executed at every 180 degrees crank angle. When the interruption routine is executed, the count C of the counter is incremented by exactly "1" and simultaneously the times $\Delta T_1$, $\Delta T_2$, $\Delta T_3$, and $\Delta T_4$ elapsed from the former interruption to the current interruption are calculated. That is, during the interruption shown by $T_1$, the elapsed time $\Delta T_1$ in the no. 2 cylinder #2 is calculated, during the interruption shown by $T_2$, the elapsed time $\Delta T_2$ in the no. 1 cylinder #1 is calculated, during the interruption routine shown by $T_3$, the elapsed time $\Delta T_3$ in the no. 3 cylinder #3 is calculated, and during the interruption routine shown by $T_4$, the elapsed time $\Delta T_4$ in the no. 4 cylinder #4 is calculated. The discrimination as to if a misfire has occurred is performed by comparing the $\Delta T_2$ and $\Delta T_4$ for the same outer tooth region I and comparing the $\Delta T_1$ and $\Delta T_3$ for the same outer tooth region II. For example, if a misfire has occurred in the no. 3 cylinder #3, as shown in FIG. 4, the elapsed time $\Delta T_3$ at the no. 3 cylinder #3 becomes longer, then the elapsed time becomes gradually shorter as shown by $\Delta T_4$ and $\Delta T_1$. In this case, the difference between $\Delta T_3$ and $\Delta T_1$ becomes greater and further $\Delta T_3$ becomes larger than $\Delta T_1$, so it is judged that a misfire has occurred at the no. 3 cylinder #3. On the other hand, the difference between $\Delta T_2$ and $\Delta T_4$ is small, so it is judged that no misfire has occurred at the no. 1 cylinder #1 and the no. 2 cylinder #2.

In the second idea, first of all the elapsed time $(\Delta T_1 + \Delta T_2 + \Delta T_3 + \Delta T_4)$ for 720 degrees crank angle from the interruption shown by $T_1$ to the interruption shown by the next $T_1$ is calculated. Next, a comparison is made between the quadruples of the elapsed times $\Delta T_1$, $\Delta T_2$, $\Delta T_3$, and $\Delta T_4$ of the cylinders and the elapsed time $(\Delta T_1 + \Delta T_2 + \Delta T_3 + \Delta T_4)$ of 720 degrees crank angle. If a misfire occurs at the no. 3 cylinder #3, then the $\Delta T_3 \cdot 4$ will become considerably longer than the elapsed time $(\Delta T_1 + \Delta T_2 + \Delta T_3 + \Delta T_4)$ of 720 degrees crank angle, so it is provisionally judged that a misfire has occurred at the no. 3 cylinder #3.

Next, a comparison is made of the $\Delta T_3$ and $\Delta T_1$ between the no. 3 cylinder #3 which is provisionally judged to have misfired and the no. 2 cylinder #2 using the same outer tooth region II. At this time, if $\Delta T_3$ is considerably larger than even $\Delta T_1$, it is judged that a misfire has occurred at the no. 3 cylinder #3. FIG. 9 to FIG. 12 show the routine for discrimination of the misfiring cylinder based on this second idea. Next, an explanation will be made of this routine for discriminating the misfiring cylinder referring to FIG. 4. Note that the routine shown from FIG. 9 to FIG. 12 is executed by interruption every 180 degrees crank angle.

Figure 9:
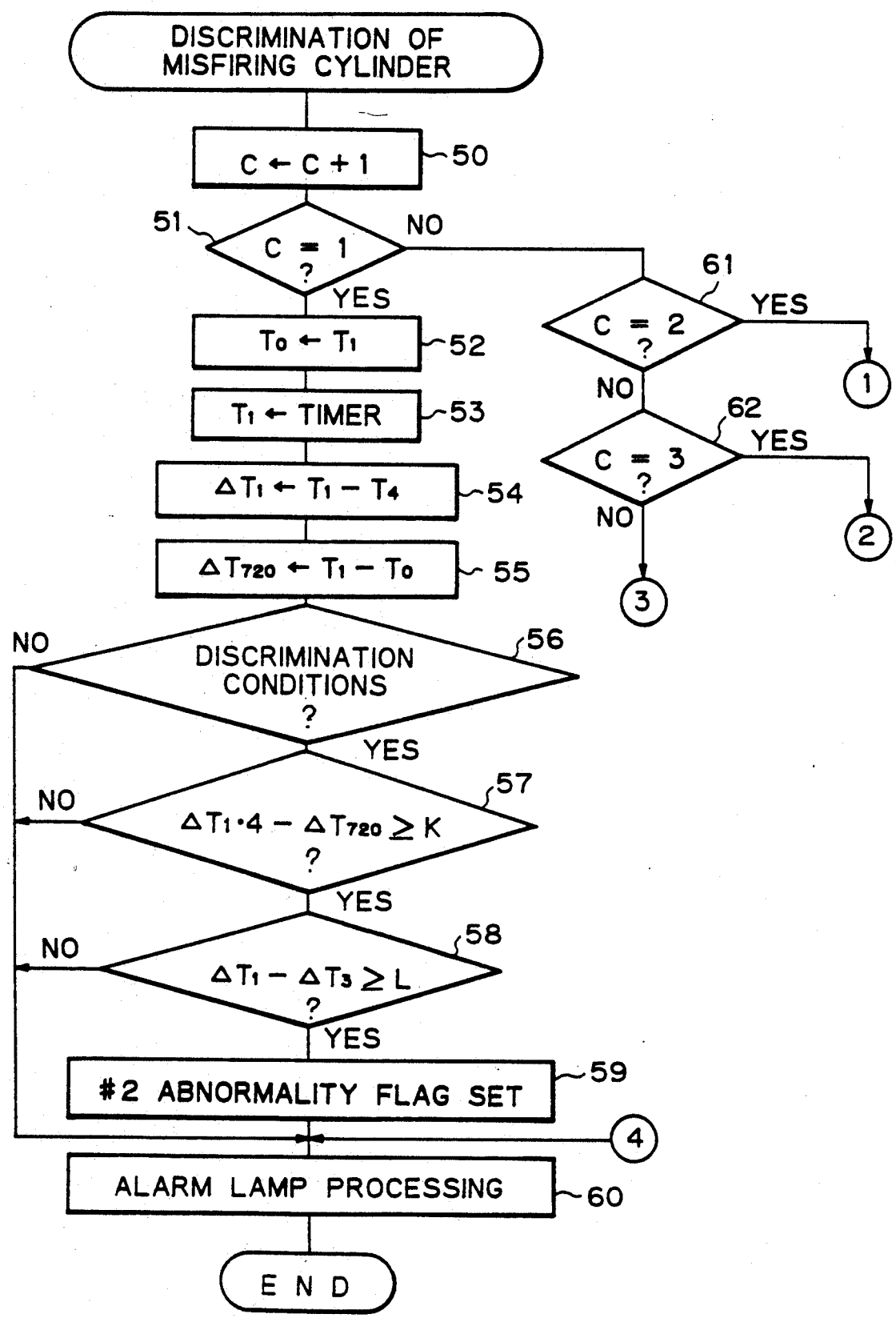
FIG. 9 to FIG. 12 are flow charts for the discrimination of the misfiring cylinder.
Figure 10:
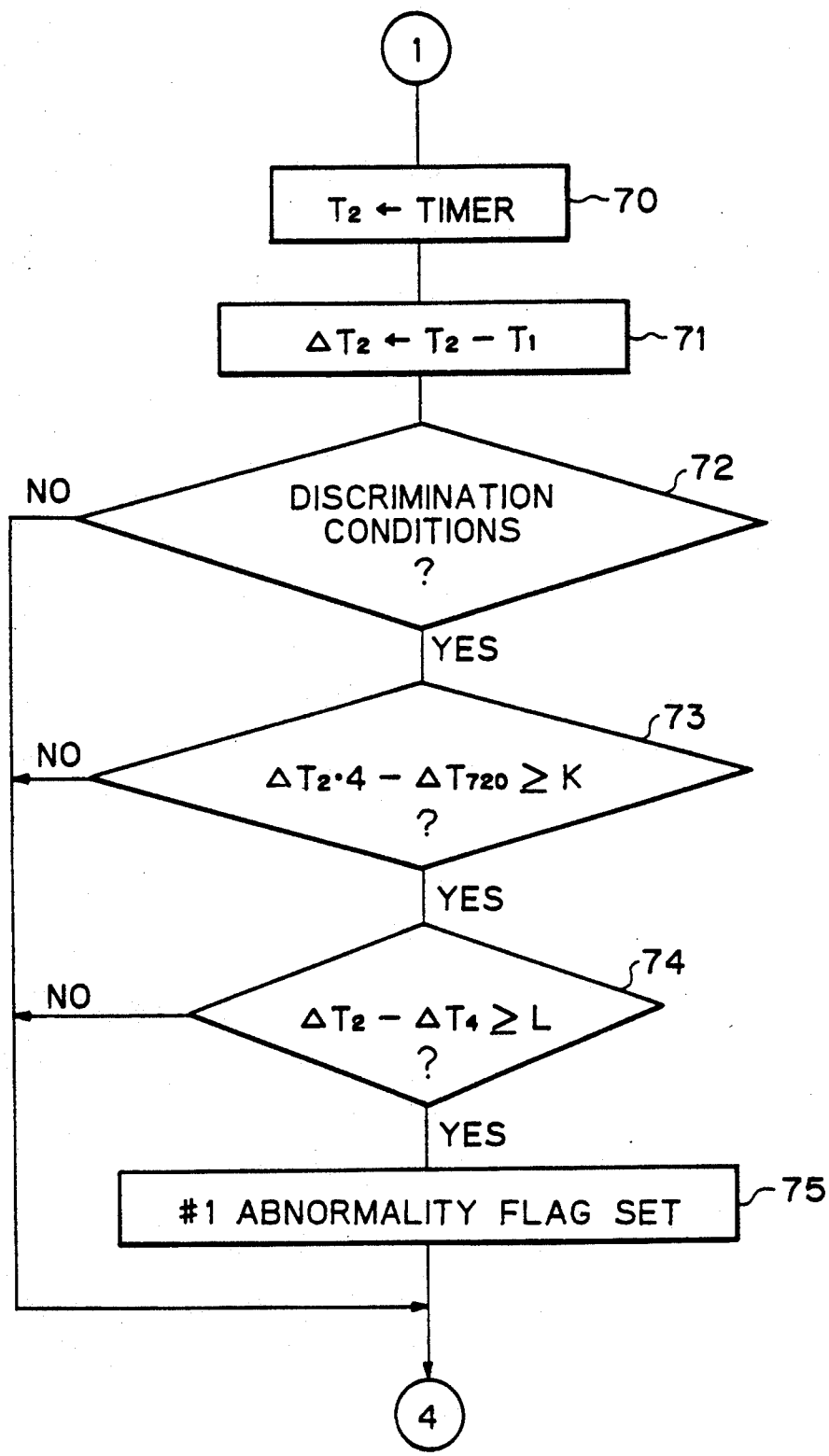
Figure 11:
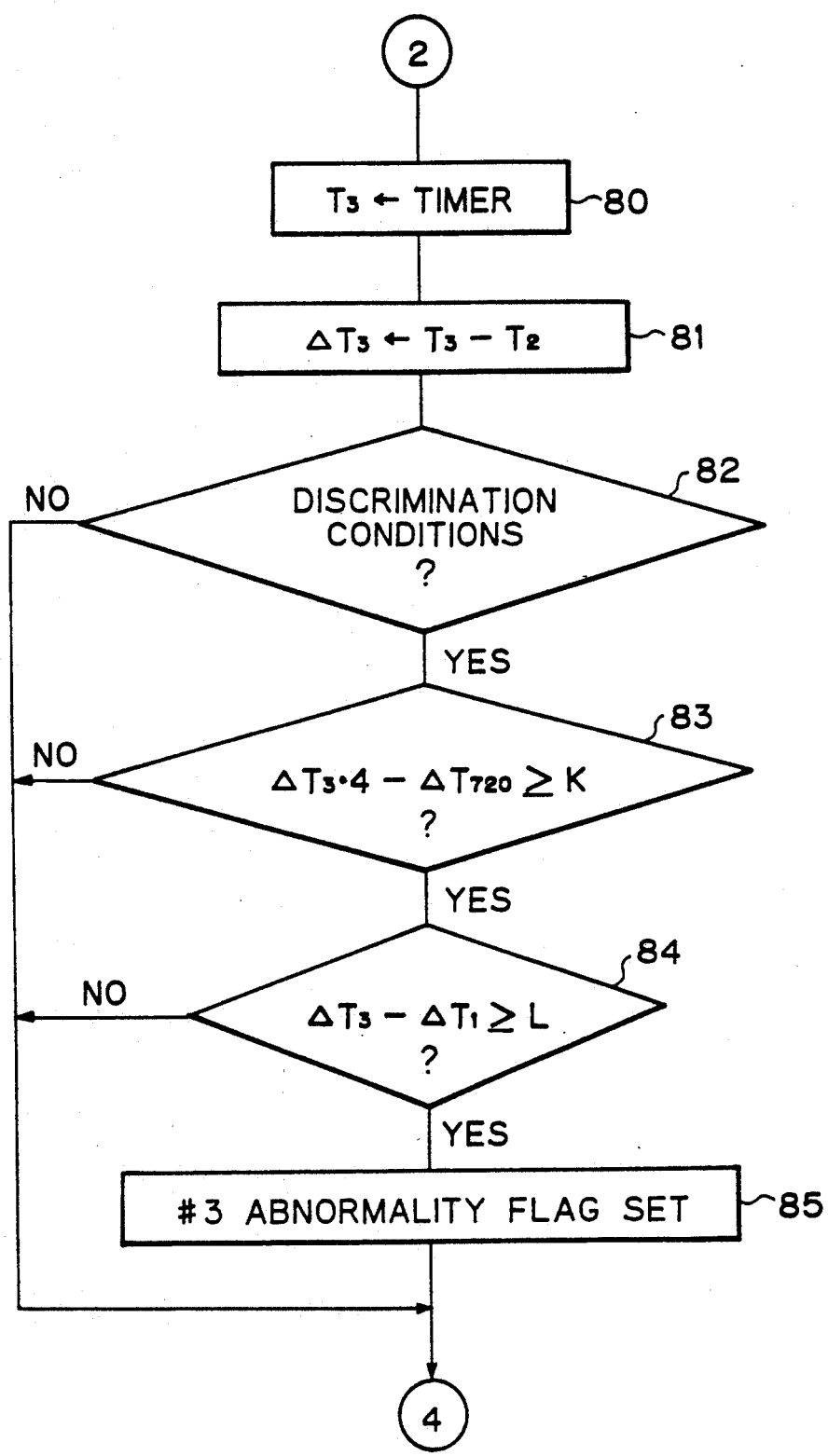

Referring to FIG. 9, first, at step 50, the count C of the counter is incremented by "1". Next, at step 51, it is judged if the count C is "1" or not. When C=1, that is, at the interruption shown by $T_1$ in FIG. 4, the routine proceeds to step 52 where the time $T_1$ is made $T_0$. Next, at step 53, the current time "Timer" counted by the timer 25 is made $T_1$. Therefore, $T_0$ in step 52 shows the time of the interruption shown by the previous $T_1$. Next, at step 54, the elapsed time $\Delta T_1 (=T_1-T_4)$ at the no. 2 cylinder #2 is calculated, then at step 55, the elapsed time $T_{720} (=T_1-T_0)$ from the interruption shown by the previous $T_1$ to the interruption shown by the current $T_1$ is calculated.

Figure 6:
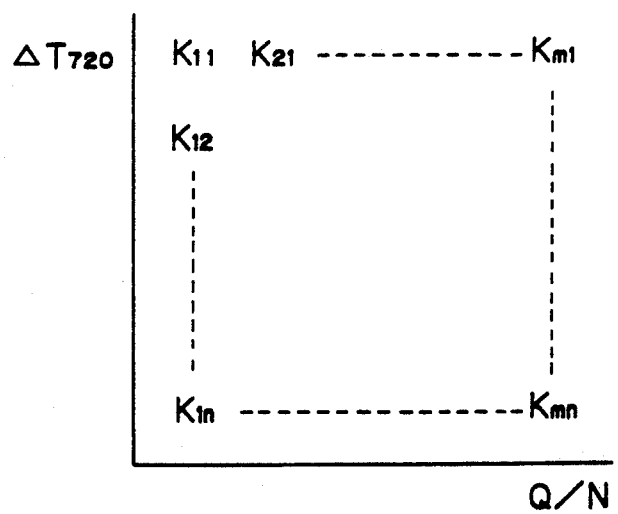
FIG. 6 is a graph showing the set value K.
Figure 7:
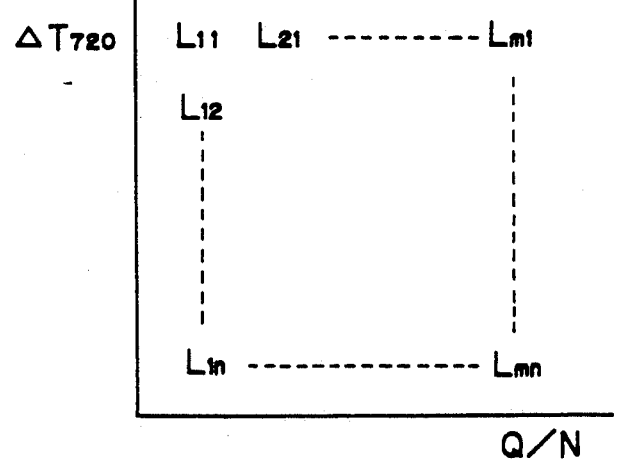
FIG. 7 is a graph showing the set value L.

Next, at step 56, it is judged if the conditions for discrimination of the misfiring cylinder stand. For example, when the engine rotational speed is not stable, such as during engine startup, rapid acceleration, or deceleration, it is judged that the conditions for discrimination of a misfiring cylinder do not stand. Whether or not the condition is of engine startup is judged, for example, by the output signal of the water temperature sensor 11 and whether the condition is rapid acceleration or deceleration is judged from the output signals of the throttle sensor 10 etc. When the conditions for discrimination of a misfiring cylinder stand, the routine proceeds to step 57. At step 57, it is judged if $(\Delta T_1 \cdot 4 - \Delta T_{720})$ is larger than a set value K. This set value K is stored in advance in the ROM 22 in the form of a map as a function of $\Delta T_{720}$ and the engine load Q/N (amount of intake air Q/engine rotational speed N) as shown in FIG. 6. Note that the set value K becomes larger the larger $\Delta T_{720}$ and becomes larger the larger the engine load Q/N. When $(\Delta T_1 \cdot 4 - \Delta T_{720}) \leq K$, the routine proceeds to step 58, where it is judged if $(\Delta T_1 - \Delta T_3)$ is larger than a set value L. This set value L is stored in advance in the ROM 22 in the form of a map as a function of $\Delta T_{720}$ and the engine load Q/N as shown in FIG. 7. Note that the set value L becomes larger then larger $\Delta T_{720}$ and larger the larger the engine load Q/N. When $(\Delta T_1 - \Delta T_3) \leq L$, the routine proceeds to step 59, where a #2 abnormality flag showing that a misfire has occurred in the no. 2 cylinder #2 is set and then the routine proceeds to step 60.

On the other hand, when it is judged at step 51 of FIG. 9 that C does not equal 1, the routine proceeds to step 61, where it is judged if the count C is 2. When C=2, that is, during the interruption shown by $T_2$ in FIG. 4, the routine proceeds to step 70 shown in FIG. 10, where the current time "Timer" counted by the timer 25 is made $T_2$. Next, at step 71, the elapsed time $\Delta T_2 \ (=T_2-T_1)$ at the no. 1 cylinder #1 is calculated. Then, at step 72, it is judged if the conditions for discrimination of the misfiring cylinder stand. If the conditions for discrimination of the misfiring cylinder stand, the routine proceeds to step 73, where it is judged if $(\Delta T_2 \cdot 4 - \Delta T_{720})$ is greater than the set value K. When $(\Delta T_2 \cdot 4 - \Delta T_{720}) \leq K$, the routine proceeds to step 74, where it is judged if $(\Delta T_2 - \Delta T_4)$ larger than a set value L. When $(\Delta T_2 - \Delta T_4) \leq L$, the routine proceeds to step 75, where a #1 abnormality flag showing that a misfire has occurred in the no. 1 cylinder #1 is set and then the routine proceeds to step 60.

On the other hand, when it is judged at step 61 of FIG. 9 that C does not equal 2, the routine proceeds to step 62, where it is judged if the count C is 3. When C=3, that is, during the interruption shown by $T_3$ in FIG. 4, the routine proceeds to step 80 shown in FIG. 11, where the current time "Timer" counted by the timer 25 is made $T_3$. Next, at step 81, the elapsed time $\Delta T_3 \ (=T_3-T_2)$ at the no. 3 cylinder #3 is calculated. Then, at step 82, it is judged if the conditions for discrimination of the misfiring cylinder stand. If the conditions for discrimination of the misfiring cylinder stand, the routine proceeds to step 83, where it is judged if $(\Delta T_3 \cdot 4 - \Delta T_{720})$ is greater than the set value K. When $(\Delta T_3 \cdot 4 - \Delta T_{720}) \geq K$, the routine proceeds to step 84, where it is judged if $(\Delta T_3 - \Delta T_1)$ is larger than a set value L. When $(\Delta T_3 - \Delta T_1) \geq L$, the routine proceeds to step 85, where a #3 abnormality flag showing that a misfire has occurred in the no. 3 cylinder #3 is set and then the routine proceeds to step 60.

Figure 12:
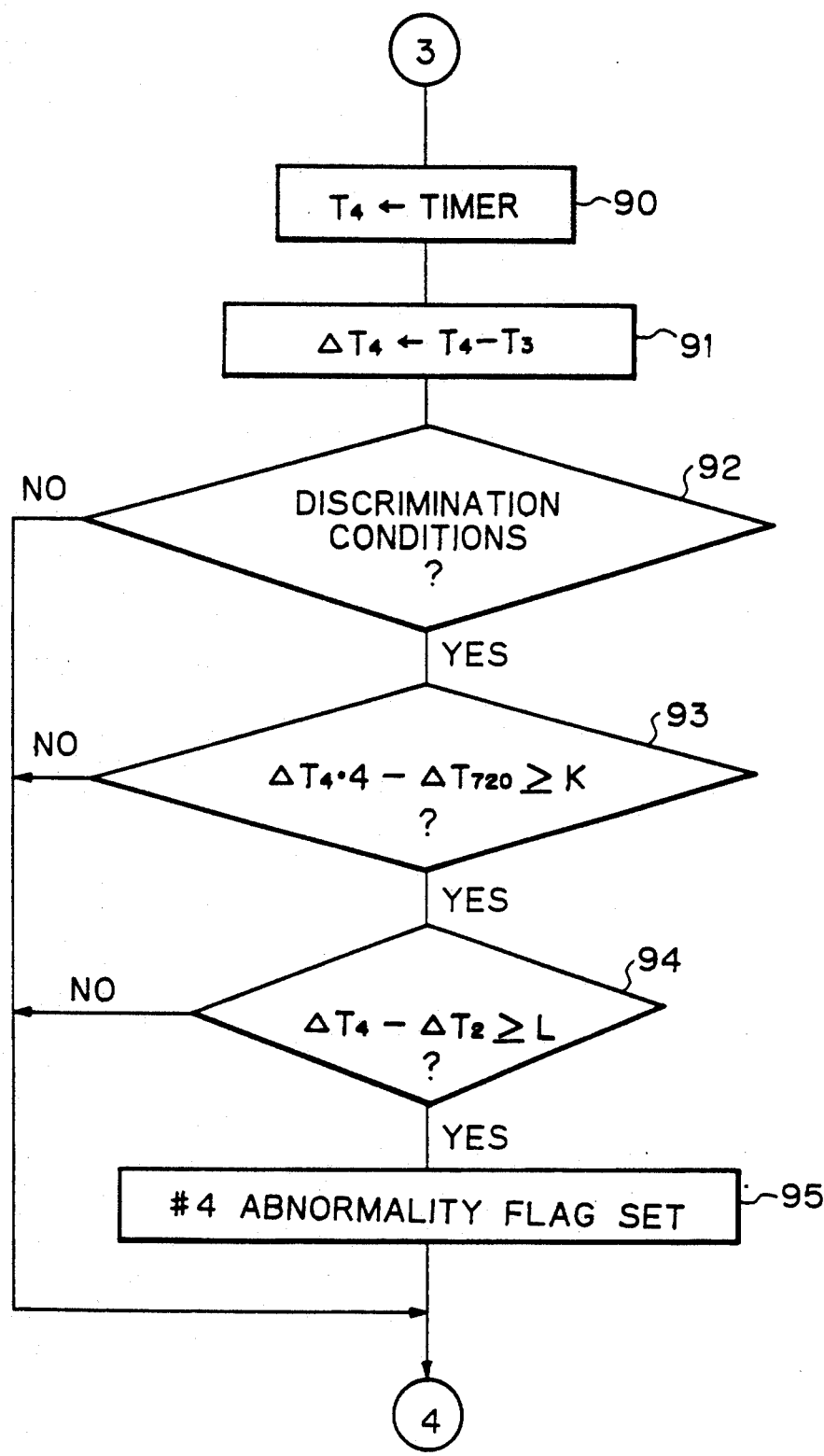

On the other hand, when it is judged at step 62 of FIG. 9 that C does not equal 3, that is, during the interruption shown by $T_4$ in FIG. 4, the routine proceeds to step 90 shown in FIG. 12, where the current time "Timer" counted by the timer 25 is made $T_4$. Next, at step 91, the elapsed time $\Delta T_4 \ (=T_4-T_3)$ at the no. 4 cylinder #4 is calculated. Then, at step 92, it is judged if the conditions for discrimination of the misfiring cylinder stand. If the conditions for discrimination of the misfiring cylinder stand, the routine proceeds to step 93, where it is judged if $(\Delta T_4 \cdot 4 - \Delta T_{720})$ is greater than the set value K. When $(\Delta T_4 \cdot 4 - \Delta T_{720}) \geq K$, the routine proceeds to step 94, where it is judged if $(\Delta T_4 - \Delta T_2)$ is larger than a set value L. When $(\Delta T_4 - \Delta T_2) \geq L$, the routine proceeds to step 95, where a #4 abnormality flag showing that a misfire has occurred in the no. 4 cylinder #4 is set and then the routine proceeds to step 60. At step 60, one of the alarm lamps 35, 36, 37, or 38 corresponding to the set abnormal flag is lit.

As explained above, by executing the routine shown from FIG. 9 to FIG. 12, it is possible to implement the two ideas mentioned above. Note that when implementing the first idea, steps 52, 55, and 57 may be deleted from FIG. 9, step 73 may be deleted from FIG. 10, step 83 may be deleted from FIG. 11, and step 93 may be deleted from FIG. 12.

Note that when starting the engine, it is not known from which crank angle the engine is rotated, so the initial count C when the engine is first started does not always become as shown in FIG. 4. The count C after the TDC pulse is once issued, however, becomes as shown in FIG. 4 and when the TDC pulse is issued twice, it is possible to accurately detect $\Delta T_{720}$. During this time, the conditions for discrimination of the misfiring cylinder do not stand. About when the conditions for discrimination of the misfiring cylinder stand, the count C becomes as shown in FIG. 4 or the $\Delta T_{720}$ is accurately detected, so there is no mistaken judgement of a misfiring cylinder.

Figure 13:
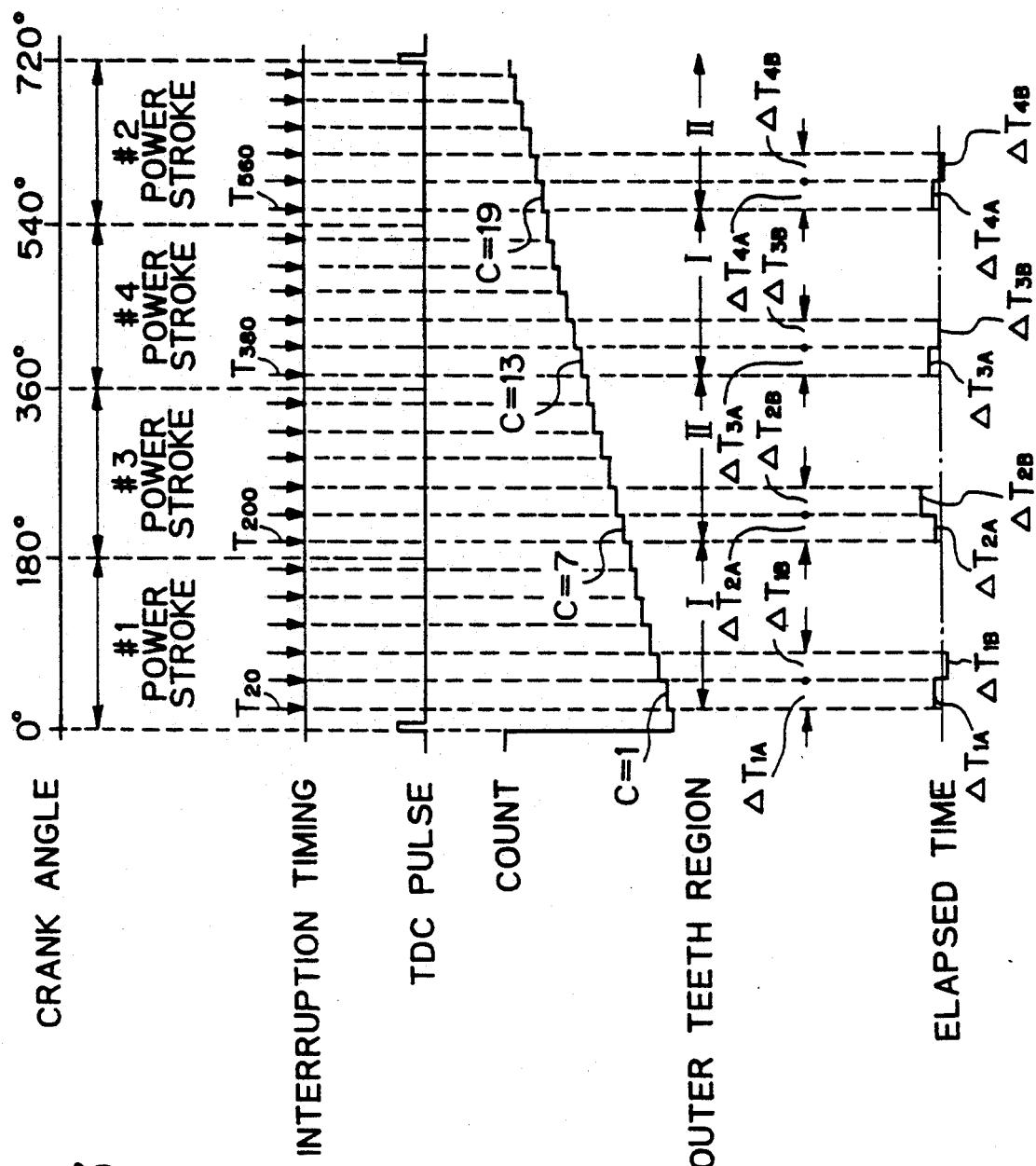
FIG. 13 is a time chart of another embodiment.

FIG. 13 shows another embodiment for implementing the above second idea. In this embodiment too, the count C is made zero when the TDC pulse is generated. Further, in this embodiment, interruption is performed every 30 degrees crank angle and each time an interruption is performed, the count C is incremented by "1". Note that the numeral i in $T_i$ showing the interruption timing shows the crank angle at the time when the interruption is performed. In this embodiment, the elapsed times $\Delta T_A$ ($\Delta T_{1A}$ for the no. 1 cylinder #1, $\Delta T_{2A}$ for the no. 3 cylinder #3, $\Delta T_{3A}$ for the no. 4 cylinder #4, and $\Delta T_{4A}$ for the no. 2 cylinder #2) from 20 degrees to 50 degrees after the TDC of the power strokes in the power strokes in the cylinders are calculated at the time of the interruption performed 50 degrees after the TDC of the power stroke and the elapsed times $\Delta T_{BA}$ ($\Delta T_{1B}$ for the no. 1 cylinder #1, $\Delta T_{2B}$ for the no. 3 cylinder #3, $\Delta T_{3B}$ for the no. 4 cylinder #4, and $\Delta T_{4B}$ for the no. 2 cylinder #2) from 50 degrees to 80 degrees after the TDC of the power strokes in the power strokes in the cylinders are calculated at the time of the interruption performed 80 degrees after the TDC of the power stroke. If no misfiring occurs, the mean value of the engine rotational speed from 50 degrees to 80 degrees after the TDC of the power stroke becomes higher than the mean value of the engine rotational speed from 20 degrees to 50 degrees after the TDC of the power stroke and therefore $\Delta T_B$ becomes smaller than $\Delta T_A$, as shown by the elapsed times $\Delta T_{1A}$, $\Delta T_{1B}$, $\Delta T_{3A}$, $\Delta T_{3B}$, $\Delta T_{4A}$, and $\Delta T_{4B}$ in FIG. 13. As opposed to this, when a misfire does occur, the mean value of the engine rotational speed from 50 degrees to 80 degrees after the TDC of the power stroke becomes lower than the mean value of the engine rotational speed from 20 degrees to 50 degrees after the TDC of the power stroke and therefore $\Delta T_B$ becomes larger than $\Delta T_A$ as shown by the elapsed times $\Delta T_{2A}$ and $\Delta T_{2B}$ in FIG. 13. Therefore, whether or not a cylinder has misfired can be provisionally judged by comparing $\Delta T_A$ and $\Delta T_B$.

Next, a comparison is made of $\Delta T_{2B}$ and $\Delta T_{4B}$ between the no. 3 cylinder #3 which was provisionally judged to have misfired and the no. 2 cylinder #2 using the same outer tooth region II. If $\Delta T_{2B}$ is considerably larger than $\Delta T_{4B}$ at this time, it is judged that a misfire has occurred at the no. 3 cylinder #3. FIG. 14 to FIG. 17 show the routine for discrimination of the misfiring cylinder based on this idea. The routine for discrimination of the misfiring cylinder will be explained next referring to FIG. 13. Note that the routine shown in FIG. 14 to FIG. 17 is executed by interruption every 30 degrees crank angle.

Figure 14:
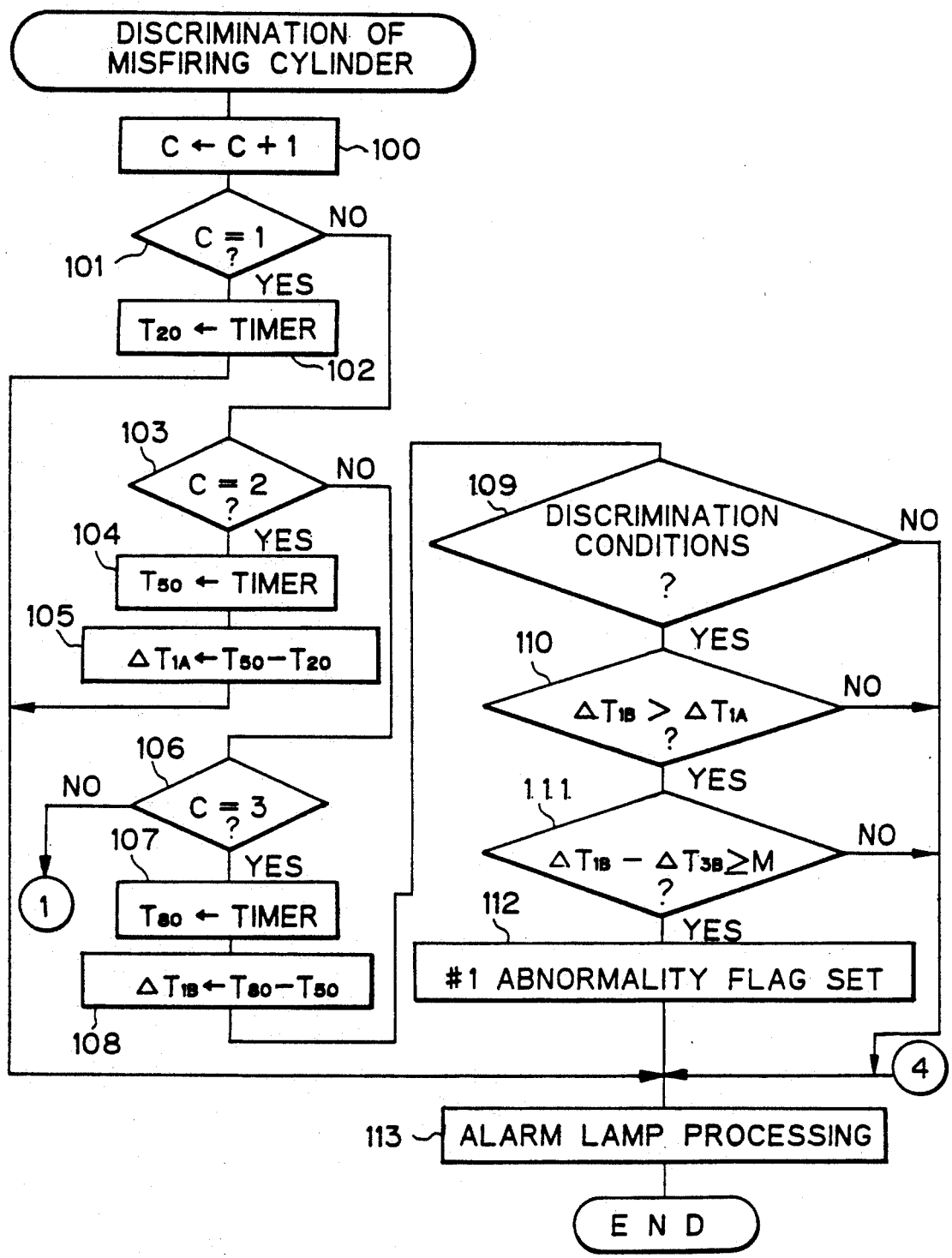
FIG. 14 to FIG. 17 are flow charts for discrimination of the misfiring cylinder.

Referring to FIG. 14, first, at step 100, the count C is incremented by "1". Next, at step 101, it is judged if the count C is 1 or not. When C=1, that is, during the interruption shown by $T_{20}$ in FIG. 13, the routine proceeds to step 102, where the current time "Timer" counted by the timer 25 is made $T_{20}$, then the routine proceeds to step 113. On the other hand, when C is not equal to 1, the routine proceeds to step 103, where it is judged if the count C is 2. When C=2, the routine proceeds to step 104, where the current time "Timer" counted by the timer 25 is made $T_{50}$, then $\Delta T_{1A}$ ($=T_{50}-T_{20}$) is calculated at step 105. Next, the routine proceeds to step 113. On the other hand, when C is not equal to 2, the routine proceeds to step 106, where it is judged if the count C is 3. When C=3, the routine proceeds to step 107.

Figure 8:
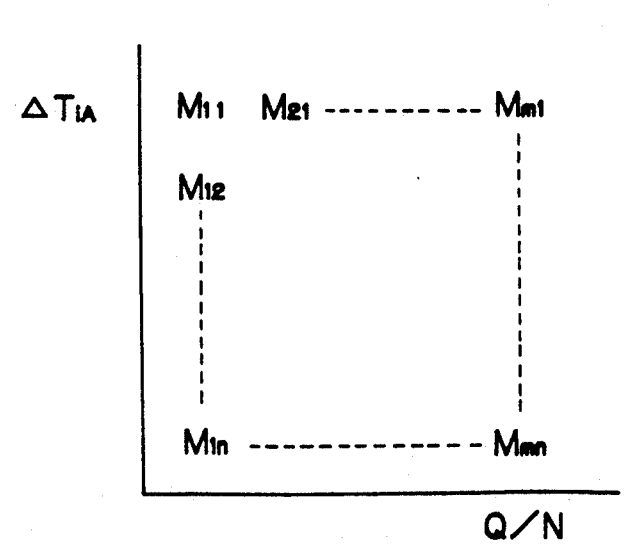
FIG. 8 is a graph showing the set value M.

At step 107, the current time "Timer" counted by the timer 25 is made $T_{80}$, then at step 108, $\Delta T_{1B}$ ($=T_{80}-T_{50}$) is calculated. Next, at step 109, it is judged if the conditions for discrimination of the misfiring cylinder stand. When the conditions for discrimination of the misfiring cylinder stand, the routine proceeds to step 110, where it is judged if $\Delta T_{1B}$ is larger than $\Delta T_{1A}$. When $\Delta T_{1B} > \Delta T_{1A}$, the routine proceeds to step 111, where it is judged if $(\Delta T_{1B} - \Delta T_{3B})$ is larger than the set value M. The set value M is stored in advance in the ROM 22 as a map as a function of $\Delta T_{iA}$ (i=1, 2, 3, or 4) currented used for the discrimination of the misfiring cylinder and the engine load Q/N, as shown in FIG. 8. Note that the set value M becomes larger the larger $\Delta T_{iA}$ and becomes larger the larger the engine load Q/N. When $(\Delta T_{1B} - \Delta T_{3B}) > M$, a #1 abnormality flag showing that a misfire has occurred at the no. 1 cylinder #1 is set and then the routine proceeds to step 113.

Figure 15:
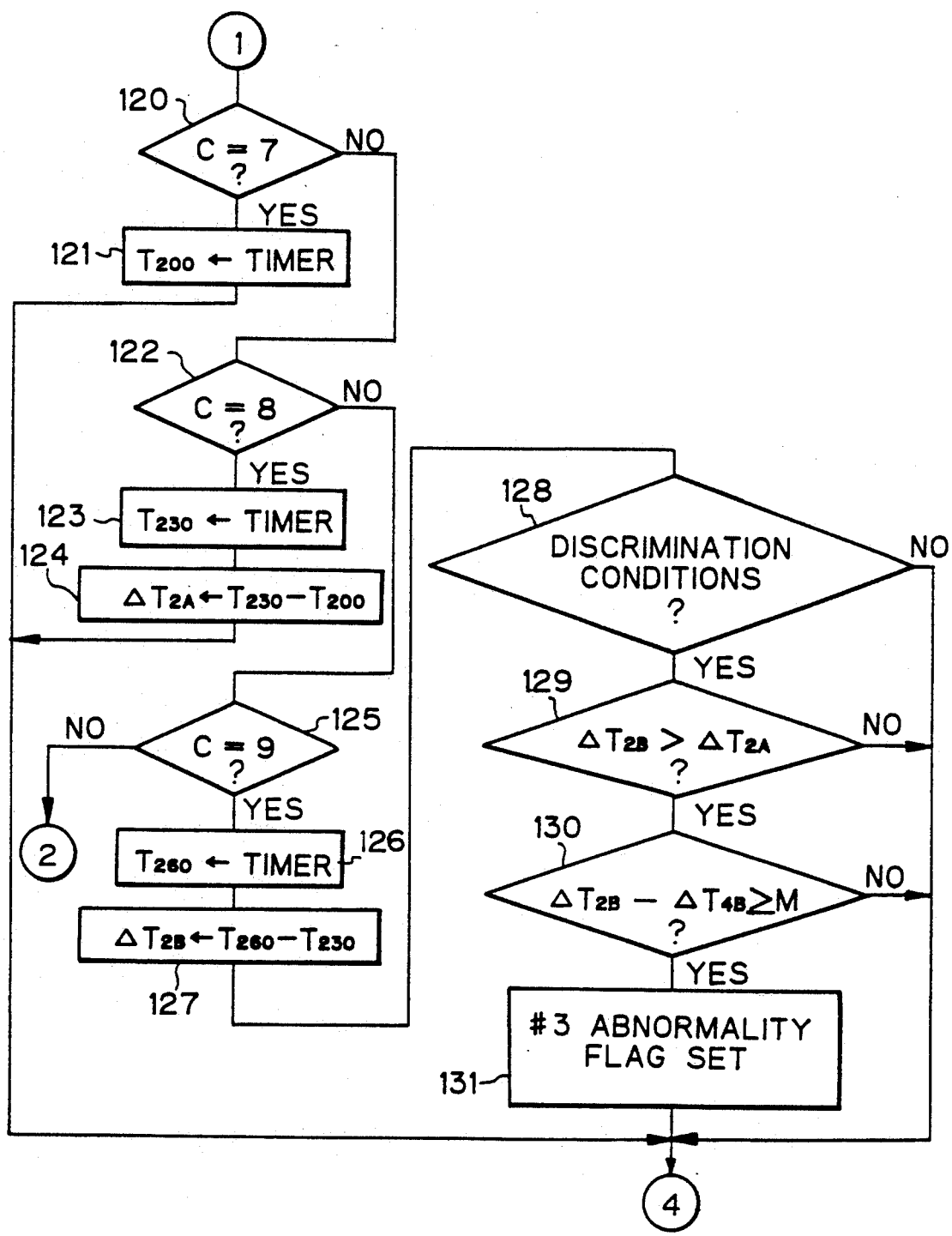
Figure 16:
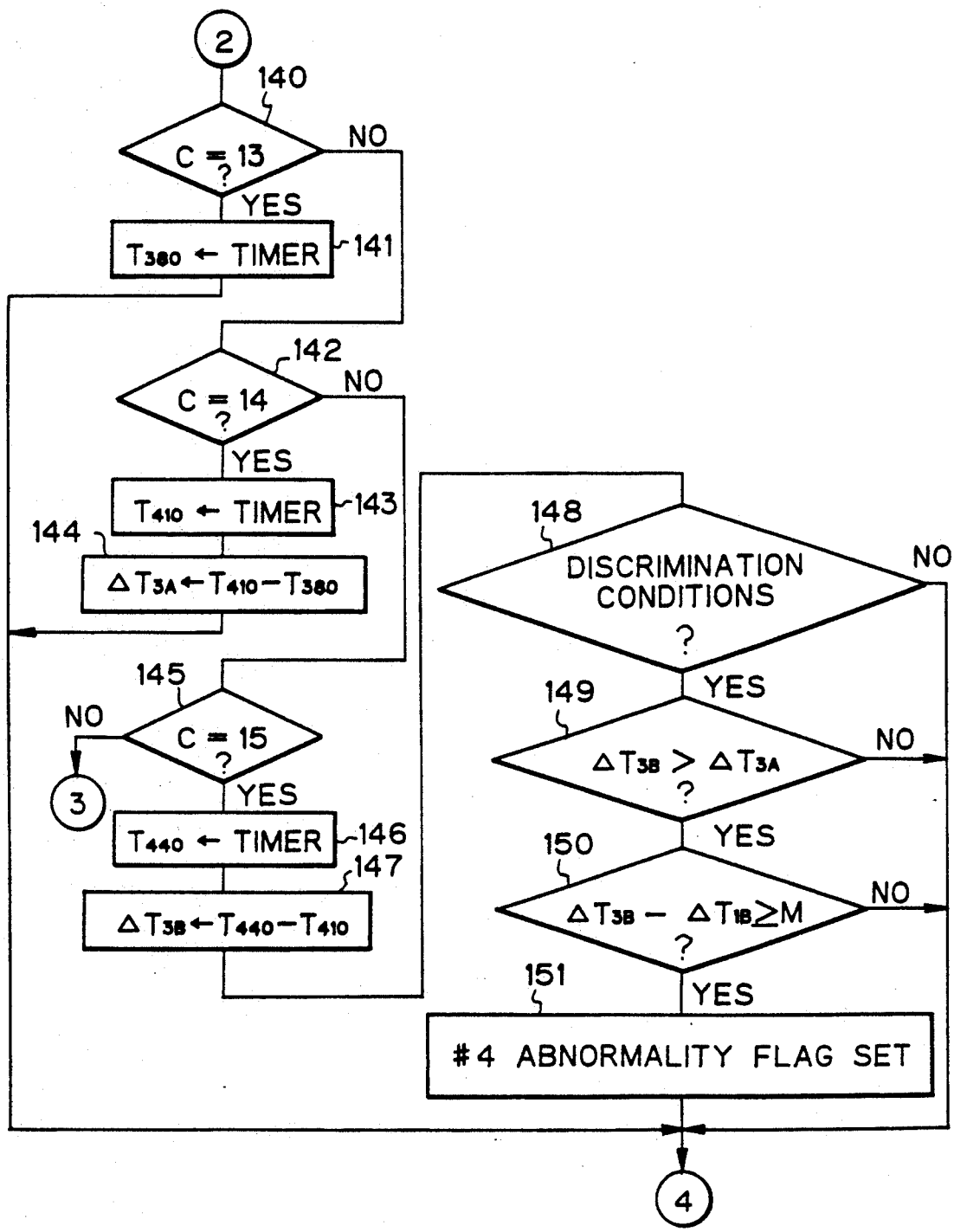

On the other hand, when it is judged at step 106 that C is not equal to 3, the routine proceeds to step 120 in FIG. 15, where it is judged if the count C is 7. When C=7, that is, during the interruption shown by $T_{200}$ in FIG. 13, the routine proceeds to step 121, where the current timing "Timer" counted by the timer 25 is made $T_{200}$, then the routine proceeds to step 113. On the other hand, when C is not equal to 7, the routine proceeds to step 122, where it is judged if the count C is 8. When C=8, the routine proceeds to step 123, where the current time "Timer" counted by the timer 25 is made $T_{230}$, then at step 124, $\Delta T_{2A}$ ($=T_{230}-T_{200}$) is calculated. Next, the routine proceeds to step 113. On the other hand, when C is not equal to 8, the routine proceeds to step 125, where it is judged if the count C is 9. When C=9, the routine proceeds to step 126.

At step 126, the current time "Timer" counted by the timer 25 is made $T_{260}$, then at step 127, $\Delta T_{2B}$ ($=T_{260}-T_{230}$) is calculated. Next, at step 128, it is judged if the conditions for discrimination of the misfiring cylinder stand. When the conditions for discrimination of the misfiring cylinder stand, the routine proceeds to step 129, where it is judged if $\Delta T_{2B}$ is greater than $\Delta T_{2A}$. When $\Delta T_{2B} > \Delta T_{2A}$, the routine proceeds to step 130, where it is judged if $(\Delta T_{2B} - \Delta T_{4B})$ is greater than the set value M. When $(\Delta T_{2B} - \Delta T_{4B}) > M$, the routine proceeds to step 131, where a #3 abnormality flag showing that a misfire has occurred in the no. 3 cylinder #3 is set, then the routine proceeds to step 113. On the other hand, when it is judged at step 125 that C does not equal 9, the routine proceeds to step 140 in FIG. 16, where it is judged if the count C is 13. When C=13, that is, during the interruption shown by $T_{380}$ in FIG. 13, the routine proceeds to step 141, where the current time "Timer" counted by the timer 25 is made $T_{380}$, then the routine proceeds to step 113. On the other hand, when C is not equal to 13, the routine proceeds to step 142, where it is judged if the count C is 14. When C=14, the routine proceeds to step 143, where the current time "Timer" counted by the timer 25 is made $T_{410}$, then at step 144, $\Delta T_{3A}$ ($=T_{410}-T_{380}$) is calculated. Next, the routine proceeds to step 113. On the other hand, when C is not equal to 14, the routine proceeds to step 145, where it is judged if the count C is 15. When C=15, the routine proceeds to step 146.

At step 146, the current time "Timer" counted by the timer 25 is made $T_{440}$, then at step 147, $\Delta T_{3B}$ ($=T_{440}-T_{410}$) is calculated. Next, at step 148, it is judged if the conditions for discrimination of the misfiring cylinder stand. If the conditions for discrimination of the misfiring cylinder stand, the routine proceeds to step 149, where it is judged if $\Delta T_{3B}$ is larger than $\Delta T_{3A}$. When $\Delta T_{3B} > \Delta T_{3A}$, the routine proceeds to step 150, wherein it is judged if $(\Delta T_{3B} - \Delta T_{1B})$ is greater than the set value M. When $(\Delta T_{3B} - \Delta T_{1B}) \geq M$, the routine proceeds to step 151, where the #4 abnormality flag showing that a misfire has occurred at the no. 4 cylinder #4 is set, then the routine proceeds to step 113.

Figure 17:
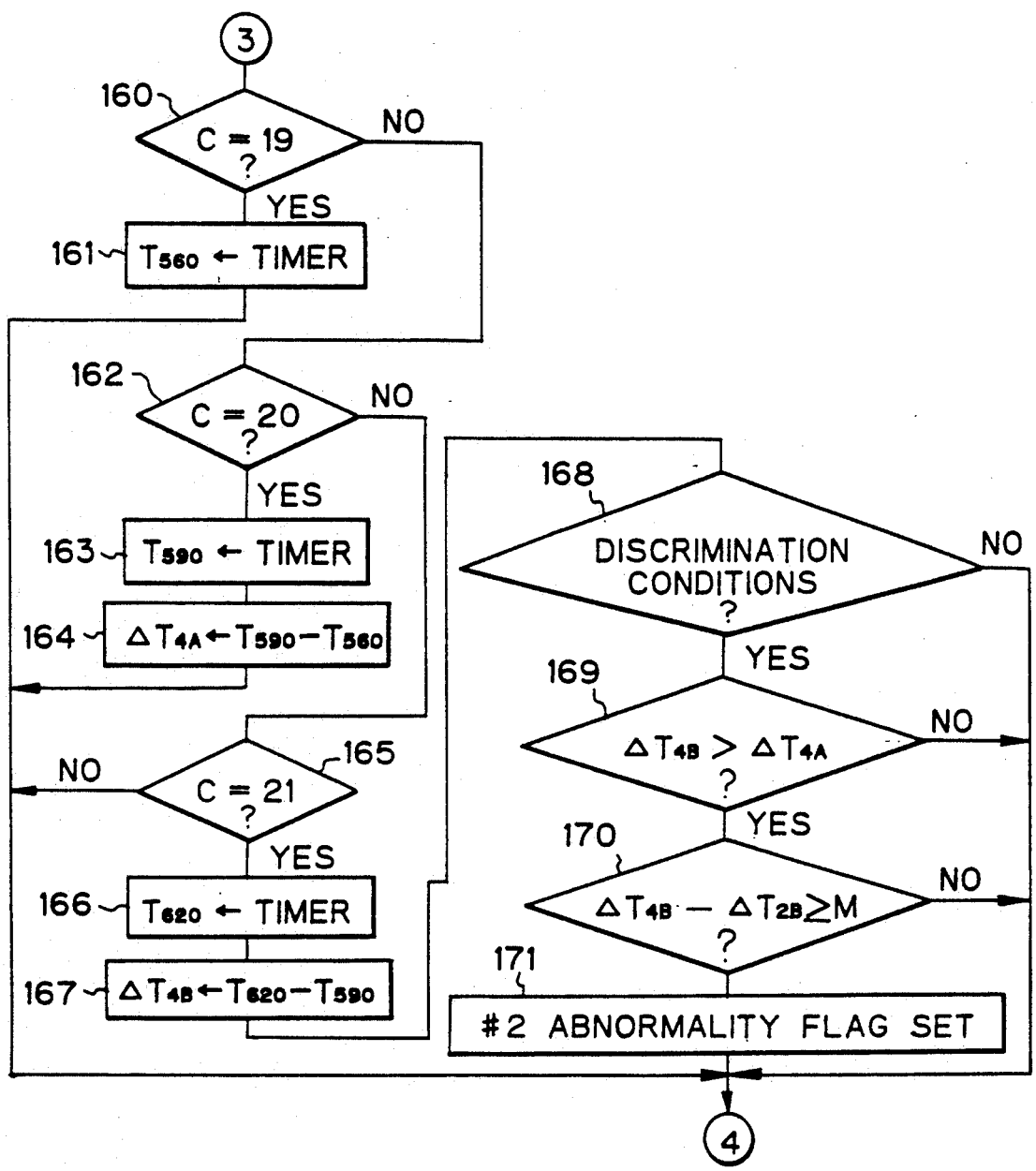

On the other hand, when it is judged at step 145 that C is not equal to 15, the routine proceeds to step 160 in FIG. 17, where it is judged if the count C is 19. When C=19, that is, during the interruption shown by $T_{560}$ in FIG. 13, the routine proceeds to step 161, where the current time "Timer" counted by the timer 25 is made $T_{560}$ and then the routine proceeds to step 113. On the other hand, when C is not equal to 19, the routine proceeds to step 162, where it is judged if the count C is 20. When C=20, the routine proceeds to step 163, where the current time "Timer" counted by the timer 25 is made $T_{590}$, then at step 164, $\Delta T_{4A}$ ($=T_{590}-T_{560}$) is calculated. Next, the routine proceeds to step 113. On the other hand, when C is not equal to 162, the routine proceeds to step 165, where it is judged if the count C is 21. When C is not equal to 21, the routine proceeds to step 113, while when C=21, it proceeds to step 166.

At step 166, the current time "Timer" counted by the timer 25 is made $T_{620}$, then at step 167, $\Delta T_{4B}$ ($=T_{620}-T_{590}$) is calculated. Next, at step 168, it is judged if the conditions for discrimination of the misfiring cylinder stand. When the conditions for discrimination of the misfiring cylinder stand, the routine proceeds to step 169, where it is judged if $\Delta T_{4B}$ is greater than $\Delta T_{4A}$. When $\Delta T_{4B} > \Delta T_{4A}$, the routine proceeds to step 170, where it is judged if $(\Delta T_{4B} - \Delta T_{2B})$ is greater than the set value M. When $(\Delta T_{4B} - \Delta T_{2B}) \geq M$, the routine proceeds to step 171, where the #2 abnormality flag showing that a misfire has occurred at the no. 2 cylinder #2 is set, then the routine proceeds to step 113. At step 113, the one of the alarm lamps 35, 36, 37, and 38 corresponding to the set abnormality flag is lit.

By executing the routine shown in FIG. 14 to FIG. 17 explained above, it is possible to implement the second idea mentioned earlier. Note that when implementing the first idea, steps 101, 102, 105, and 110 in FIG. 14 may be deleted, steps 120, 121, 124, and 129 in FIG. 15 may be deleted, steps 140, 141, 144, and 149 in FIG. 16 may be deleted, and steps 160, 161, 164, and 149 in FIG. 17 may be deleted.

Up to here, the explanation was made of the case of use of the present invention for a four-cylinder internal combustion engine, but the invention may also be used for internal combustion engines with six or more cylinders. When applying the routine shown in FIG. 9 to FIG. 12 to a six-cylinder internal combustion engine, however, the routine is executed by interruption every 120 degrees crank angle.

According to the present invention, it is possible to accurately detect which of the cylinders is misfiring regardless of the running state of the engine.

While the invention has been described by reference to specific embodiments chosen for purposes of illustration, it should be apparent that numerous modifications could be made thereto by those skilled in the art without departing from the basic concept and scope of the invention.

I claim:

1. A device for determining a misfiring cylinder of a multicylinder engine having a crankshaft, said device comprising:
   a rotor rotating in synchronization with the crankshaft and having a plurality of detectable elements which are equiangularly arranged on said rotor;
   detecting means arranged to successively face said detectable elements and produce an output signal every time said detecting means faces each detectable element;
   angular velocity calculating means for calculating angular velocities of the crankshaft in at least a part of the power stroke period of two different cylinders on the basis of the output signals of said detecting means, which signals are produced by using a part of said detectable elements arranged in the same region of said rotor;
   difference calculating means for calculating a difference between said angular velocities in said part of the power stroke period of two different cylinders; and
   misfire determining means for determining that a misfire occurs in one of two cylinders in which the angular velocity is lower when said difference exceeds a predetermined value.

2. A device as set forth in claim 1, wherein the said detectable elements are comprised of outer teeth formed on an outer circumference of the said rotor.

3. A device as set forth in claim 1, wherein said detecting means is comprised of an electromagnetic pickup.

4. A device as set forth in claim 1, wherein said same region is not larger than 180 degrees crank angle.

5. A device as set forth in claim 1, wherein said angular velocity calculating means calculates the angular velocity of the crankshaft from the time interval of generation of the output signals of the said detecting means.

6. A device as set forth in claim 1, wherein the said time interval of generation of the output signals of the said detecting means is used as a representative value showing the angular velocity of the crankshaft.

7. A device as set forth in claim 6, wherein a difference of said angular velocities is expressed by a difference of the time intervals of generation of the output signals of the detecting means and wherein said misfire determining means judges that a misfire has occurred at a cylinder, among the two cylinders, with the longer said time interval of generation when the difference of said time intervals of generation exceeds a predetermined value.

8. A device as set forth in claim 6, wherein said predetermined value is a function of the time interval of generation of the output signals of the said detecting means and the engine load.

9. A device as set forth in claim 8, wherein said predetermined value becomes larger the longer the time interval of generation of the output signals of said detecting means and wherein said predetermined value becomes larger the higher the engine load.

10. A device as set forth in claim 1, further comprising a provisional misfiring cylinder determining means which provisionally determines a misfiring cylinder from the difference of the angular velocities, wherein said misfire determining means judges that a misfire has occurred in a cylinder judged provisionally to have misfired when the difference of the angular velocities of the two cylinders including the cylinder judged provisionally to have fired exceeds a predetermined value and the angular velocity of the cylinder judged provisionally to have misfired is lower than the angular velocity of the other cylinder.

11. A device as set forth in claim 10, wherein said angular velocity calculating means uses the time interval of generation of the output signals of said detecting means as a representative value indicating the angular velocity of the crankshaft and wherein said provisional misfiring cylinder determining means provisionally determines the misfiring cylinder from the difference of the said time intervals of generation.

12. A device as set forth in claim 11, wherein said provisional misfiring cylinder determining means multiplies the said time interval of generation of a certain cylinder by the number of cylinders and provisionally determines that a misfire has occurred in that certain cylinder when the resultant value becomes longer than the total of the said time intervals of generation of all the cylinders by a predetermined set value.

13. A device as set forth in claim 12, wherein said time interval of generation coincides with the elapsed time in the power stroke of the cylinders.

14. A device as set forth in claim 12, wherein said predetermined set value is a function of the total of the time intervals of generation of all the cylinders and the engine load.

15. A device as set forth in claim 14, wherein said predetermined set value becomes larger the larger the total of the time intervals of generation of all the cylinders and said predetermined set value becomes larger the higher the engine load.

16. A device as set forth in claim 12, wherein said misfiring determining means judges that a misfire has occurred in a cylinder provisionally determined to have misfired when the difference in the time intervals of generation of the two cylinders including the cylinder provisionally determined to have misfired exceeds a predetermined value and the time interval of generation of the cylinder provisionally determined to have misfired is longer than the time interval of generation of the other cylinder.

17. A device as set forth in claim 11, wherein said provisional misfiring cylinder determining means compares said time interval of generation in the first crank angle region in the first half of the power stroke and judges that a misfire has occurred when said time interval of generation of the second crank angle region in the first half of the power stroke, which is after the first crank angle region, becomes longer.

18. A device as set forth in claim 17, wherein said first crank angle region is substantially 20 degrees to 50 degrees after TDC and said second crank angle region is substantially 50 degrees to 80 degrees after TDC.

19. A device as set forth in claim 17, wherein said misfiring determining means judges that a misfire has occurred in a cylinder provisionally determined to have misfired when the difference in the time intervals of generation in the second crank angle region of the two cylinders including the cylinder provisionally determined to have misfired exceeds a predetermined value and the time interval of generation in said second crank angle region of the cylinder provisionally determined to have misfired is longer than the time interval of generation in the second crank angle region of the other cylinder.

20. A device as set forth in claim 19, wherein said predetermined set value is a function of said time interval of generation in said first crank angle region and the engine load.

21. A device as set forth in claim 20, wherein said predetermined set value becomes larger the longer the time interval of generation in said first crank angle region and said predetermined set value becomes larger the higher the engine load.

* * * * *

UNITED STATES PATENT AND TRADEMARK OFFICE
CERTIFICATE OF CORRECTION

PATENT NO. : 5,245,865
DATED : 9/21/93
INVENTOR(S) : Nobuaki Kayanuma

It is certified that error appears in the above-indentified patent and that said Letters Patent is hereby corrected as shown below:

| Column | Line | |
|---|---|---|
| 6 | 51 | Change "$\leq$ K" to --$\geq$ K--. |
| 6 | 57 | Change "then" to --the--. |
| 6 | 58 | Change "$\leq$ L" to --$\geq$ L--. |
| 7 | 6 | Change "$\leq$ K" to --$\geq$ K--. |
| 7 | 9 | Change "$\leq$ L" to --$\geq$ L--. |
| 9 | 14 | Change "currented" to --currently--. |
| 10 | 49 | Change "149" to --169--. |

Signed and Sealed this

Seventh Day of June, 1994

*Attest:*

BRUCE LEHMAN

*Attesting Officer*     *Commissioner of Patents and Trademarks*